UNITED STATES PATENT OFFICE.

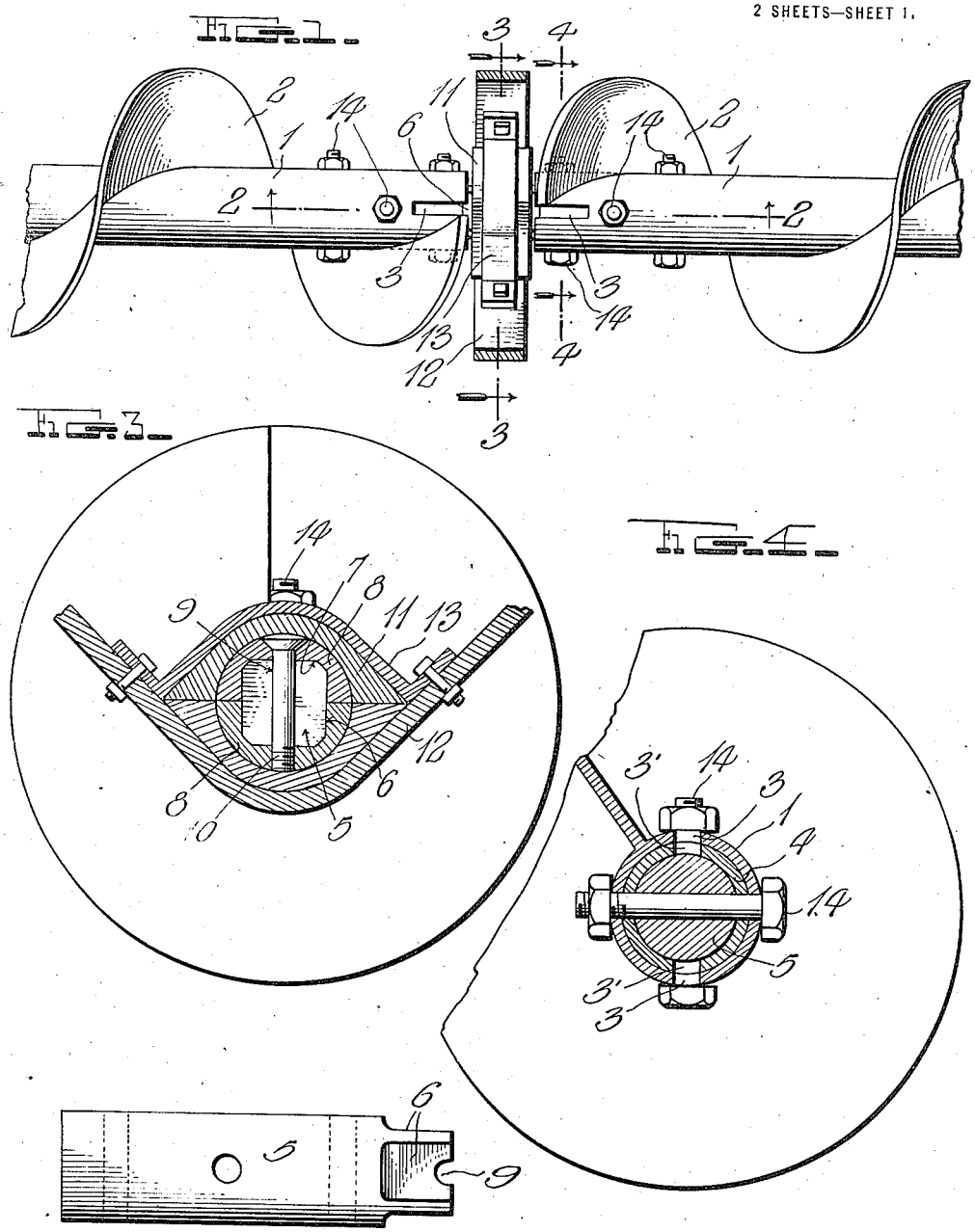

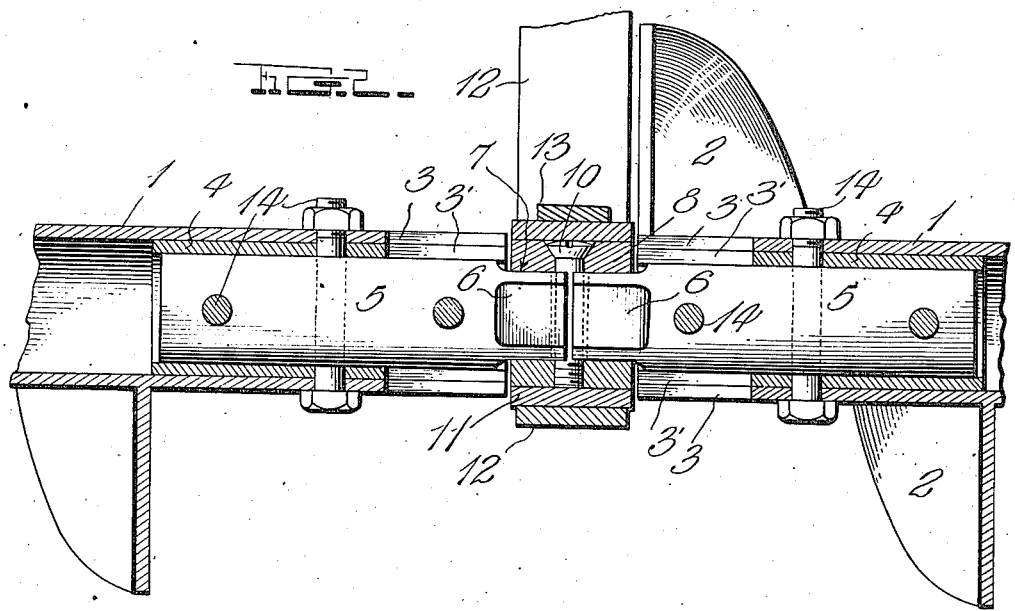
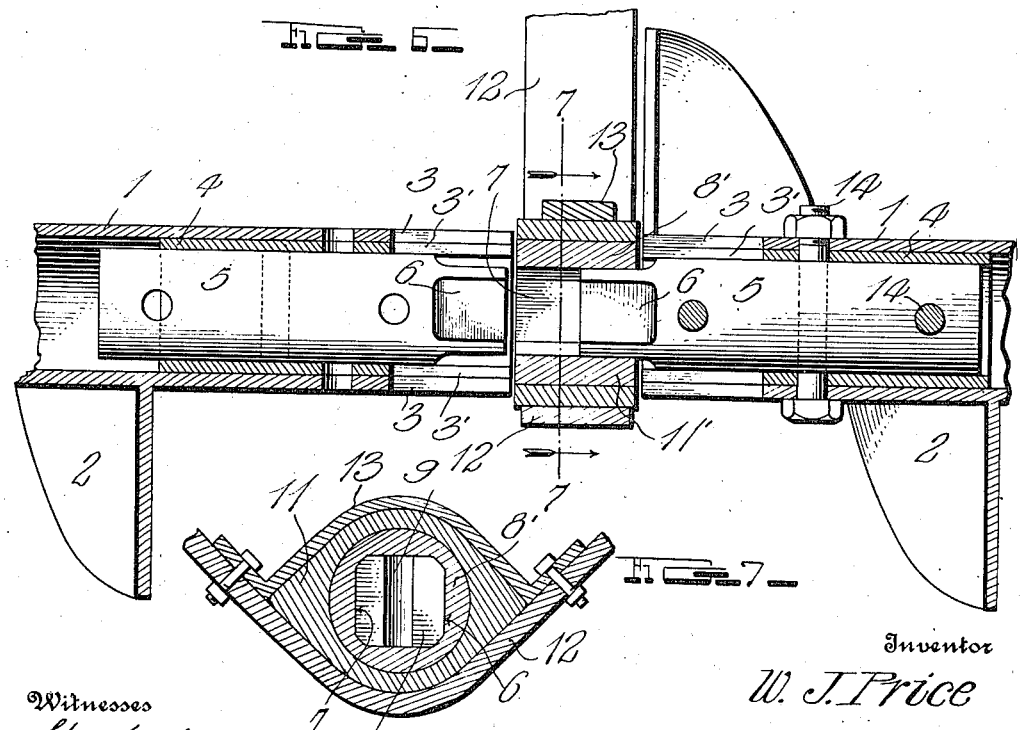

WILLIAM JOHN PRICE, OF DIXON, ILLINOIS, ASSIGNOR OF ONE-HALF TO E. J. STECKLE, OF DIXON, ILLINOIS.

SHAFT-COUPLING.

1,158,844.  Specification of Letters Patent.  Patented Nov. 2, 1915.

Application filed November 19, 1914. Serial No. 873,045.

*To all whom it may concern:*

Be it known that I, WILLIAM J. PRICE, a subject of the King of England, residing at Dixon, in the county of Lee and State of Illinois, have invented certain new and useful Improvements in Shaft-Couplings; and I do declare the following to be a full, clear, and exact description of the invention, such as will enable others skilled in the art to which it appertains to make and use the same.

My invention relates broadly to improvements in shaft couplings and more particularly to those designed for coupling the various sections of conveyer shafts, such for instance, as those used in cement mills. These conveyers range, in length, from fifty to three hundred feet or over and it has been found that it is practically impossible to provide unbreakable joints for connecting the various sections of the shaft.

Numerous attempts have been made to provide unbreakable connections between the various sections of the shaft, but since these attempts have proved futile, it becomes expedient to provide simple and efficient means whereby a broken coupling may be quickly and easily replaced.

With the common types of conveyers now used, the breaking of the coupling necessitates the dismantling of the entire shaft from the break to one end thereof.

It is to provide a simple form of coupling which may be readily replaced without dismantling the entire shaft, that I have provided the construction hereinafter described and claimed and shown in the drawings wherein:

Figure 1 is a top plan view of a pair of conveyer sections showing the application of my invention in connecting the shafts thereof; Fig. 2 is a vertical longitudinal section through the parts seen in Fig. 1; Figs. 3 and 4 are transverse sections taken on the planes of the lines 3—3 and 4—4 of Fig. 1; Fig. 5 is a side elevation of one of the gudgeons; Fig. 6 is a view similar to Fig. 2 but showing a slightly different form of journal and bearing, this view likewise showing one of the gudgeons retracted; and Fig. 7 is a transverse section taken on the line 7—7 of Fig. 6.

In the embodiment illustrated in the accompanying drawings forming a part of this application, a pair of hollow conveyer shaft sections 1 is shown, said sections being surrounded by spiral conveying webs 2 which are designed to rotate within a trough (not shown). The adjacent ends of the sections 1 are slotted longitudinally as seen at 3 and are provided with internal bushings 4 which are slotted at 3′, said last named slots registering with the slots 3 as shown. Mounted to slide longitudinally within the bushings 4 are cylindrical gudgeons 5 whose outer ends are reduced and squared as seen at 6, said squared ends constituting clutch members which project into a polygonal opening 7 in a sectional journal 8 (see Figs. 2 and 3) or into a solid journal 8′ (see Figs. 6 and 7).

When a sectional journal 8 is provided, the adjacent squared ends 6 are grooved transversely as seen at 9, in order to allow a clamping screw 10 to pass through the two sections of the journal, thereby retaining the same in active position. When a solid journal is employed, however, the gudgeons need not necessarily be grooved, although one form is readily adaptable to either type of journal.

It may here be explained that the opposite ends of the opening 7 constitute combined coupling and clutch members which coact with the squared ends 6, the latter likewise constituting coupling and clutch elements.

As shown in various figures of the drawings, the journals 8 and 8′ are revolubly mounted in bearings which may be sectional as seen at 11 in Figs. 2 and 3, or may be of solid construction as shown at 11′ in Figs. 6 and 7, this being an unimportant feature. The bearings 11 or 11′, as the case may be, are clamped in contact with V-shaped hangers 12 by yokes 13 as seen in Figs. 3 and 7, these hangers being designed for attachment to the above-mentioned trough, as is common with devices of this character.

With the parts as above described, the gudgeons 5 are held against inward movement within the bushings 4 by clamping bolts 14. When in this position, the adjacent ends of said gudgeons are spaced as seen in the drawings, thereby allowing for expansion of the ends of the conveyer sections, while the ends of the shafts 1 and bushings 4 are spaced from the ends of the bearings and hangers, for the same purpose. When now it becomes necessary to remove a journal or a gudgeon, the bolts securing the latter are first removed, after which a cold chisel or any appropriate tool is inserted through certain of the alined slots 3 and 3', said chisel being employed together with a hammer or mallet for retracting the gudgeon within its bushing 4. The shaft section 1 carrying the retracted gudgeon, may now be raised, thereby allowing the latter to be removed and replaced, if necessary, and likewise allowing the journal 10 to be removed and replaced.

It will be understood that the above described operation need not take place when sectional journals and bearings are employed, since the upper sections of these parts may be removed. It is a considerably easier task, however, to repair the connection by retracting the gudgeon than by removing the yokes and the upper sections of said journals and bearings. The sliding gudgeon structure therefore becomes advantageous with numerous forms of journals and bearings.

It will be readily understood that one-half of the connection, above described, might well be employed for connecting the driving wheel of the conveyer with the adjacent shaft section. In order to cover this use, I have termed the journal 8 or 8' a driven member in the claims, as it is in reality.

Particular attention is directed to the fact that a coupling constructed as above set forth will readily compensate for expansion and contraction of the various shaft sections, since the opposite ends of these sections, as well as the bushings 4 are spaced from the ends of the bearings and journals. Expansion and contraction are also catered to, by spacing the walls of the grooves 9 suitable distances from the screws 10, and by allowing the reduced ends 6 of the gudgeons 5 to slide within the journals. This construction, for allowing the necessary expansion and contraction, is essential, especially when the couplings are provided in a conveyer of considerable length.

From the foregoing description, taken in connection with the accompanying drawings, it will be seen that I have provided a comparatively simple structure for carrying out the objects of the invention yet that the efficiency of the device will not be impaired by such simplicity.

I claim:—

1. The combination with a bearing and a journal rotatably mounted therein and having polygonal clutch members at its opposite ends, of extensible shafts adjacent the ends of the journal, and having clutch members slidably engaging those on the journal.

2. The combination with a bearing and a journal revolubly mounted therein and having a polygonal opening, of extensible shaft sections adjacent the ends of the journal and having polygonal ends projecting slidably into the opening therein.

3. The combination with a bearing and a journal rotatably mounted therein and having clutch members at its opposite ends, of hollow shaft sections adjacent the opposite ends of said journal and alined therewith, gudgeons slidable in said hollow shaft sections and having clutch members slidably engaged with those of the journal, and means whereby the gudgeons may be releasably held against shifting.

4. The combination with a bearing and a journal rotatably mounted therein, and having clutch members on its opposite ends, of hollow shaft sections adjacent the opposite ends of said journal, gudgeons slidable in said sections and having clutch members slidably engaged with those of the journal, and releasable means for holding said gudgeons against movement, said shaft sections being slotted to provide for the insertion of a gudgeon shifting tool.

5. The combination with a bearing and a journal revolubly mounted therein and having a polygonal opening at its center, of hollow shaft sections adjacent the opposite ends of said journal, gudgeons slidable in said sections and having reduced polygonal ends projecting into said opening, and releasable means for holding said gudgeons against movement, said shaft sections being slotted to provide for the insertion of a gudgeon shifting tool.

6. The combination with a driven clutch element, of a non-shiftable shaft alined therewith, a longitudinally shiftable clutch member carried by said shaft and engaged with the aforesaid clutch element, free to slide endwise therefrom, and serving as the sole means of supporting one end of said shaft.

7. The combination with a driven member having a polygonal opening, of a non-shiftable shaft alined with said opening, a polygonal longitudinally shiftable clutch element carried by the shaft, disposed in and free to slide endwise from said opening, and acting as the sole means of supporting one end of said shaft.

8. The combination with a driven member having a polygonal opening, of a hollow shaft adjacent said opening, a gudgeon slidable in said shaft and having a polygonal end disposed in said opening, and free to slide endwise therefrom means whereby said gudgeon may be locked against sliding.

In testimony whereof I have hereunto set my hand in presence of two subscribing witnesses.

WILLIAM JOHN PRICE.

Witnesses:
 JAMES F. HALEY,
 E. M. CONLEY.